Figure 1:
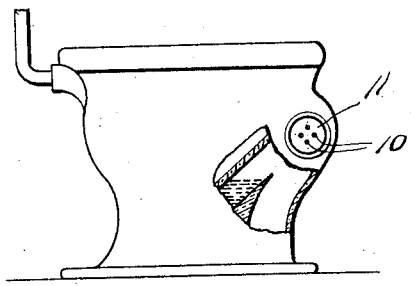

E. REINHART & A. MOE.
TRAP CLEAN-OUT.
APPLICATION FILED JUNE 18, 1917.

1,265,248.

Patented May 7, 1918.

WITNESSES
Chas. E. Kemper.
D. K. Galt.

INVENTOR
Ernest Reinhart.
Andrew Moe.

BY Richard Owen.

ATTORNEY

UNITED STATES PATENT OFFICE.

ERNEST REINHART AND ANDREW MOE, OF EAU CLAIRE, WISCONSIN.

TRAP CLEAN-OUT.

1,265,248.  Specification of Letters Patent.  Patented May 7, 1918.

Application filed June 18, 1917. Serial No. 175,492.

*To all whom it may concern:*

Be it known that ERNEST REINHART and ANDREW MOE, citizens of the United States, residing at Eau Claire, in the county of Eau Claire and State of Wisconsin, have invented certain new and useful Improvements in Trap Clean-Outs, of which the following is a specification.

This invention relates to trap clean outs, and is adapted particularly for use in connection with closet bowls.

The primary object of the invention is to provide means whereby access may be readily had to the trap of a closet bowl whereby the same may be easily cleaned out when clogged.

A further object of the invention is to provide a clean-out of the character described by the use of which the instruments heretofore employed for cleaning out flush bowls may be dispensed with, and which is capable of being applied to the bowl in such manner as to minimize the opportunity for leakage.

With these objects in view together with others which will appear as the description proceeds, the invention resides in the novel formation, combination and arrangement of parts, all as will be described more fully hereinafter, illustrated in the drawing, and particularly pointed out in the claim.

Figure 2:
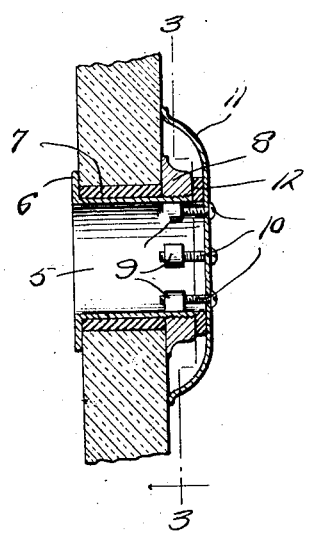
Figure 3:
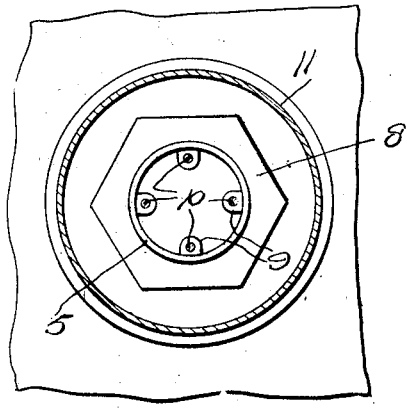

In the drawing:

Figure 1 is a side elevation, parts broken away, of a conventional form of closet bowl and illustrating the application of a trap cleanout constructed in accordance with the invention, Fig. 2 is a fragmentary sectional view on an enlarged scale, and illustrating the details of the clean out mechanism, Fig. 3 is a sectional view taken substantially upon line 3—3 of Fig. 2.

Referring now particularly to the drawing, there is illustrated a conventional form of lavatory with which the improved trap clean out is associated.

This clean out is located in the side or front wall of the bowl, and at the upper part of the "goose-neck", thereof so as to be above the normal water level within the bowl. It is at this particular place in the lavatory that stoppage or clogging usually occurs, and the aperture constituting the clean out is preferably of such size as to permit of the hand being inserted into the interior of the trap and "goose-neck".

In carrying out the invention, the porcelain or other material of which the bowl is formed, is provided at the proper place with an opening or aperture of proper size, and in the present instance, this aperture is round. A ferrule indicated at 5 having a flange 6 at one end is inserted through the aperture, with the flanged end upon the interior of the bowl. This ferrule is of slightly less diameter than the aperture in the porcelain wall of the bowl, and the flange holds the ferrule against passing through the aperture. A gasket 7 is interposed between the outer walls of the ferrule and the walls defining the opening in the porcelain. The outer end of this ferrule projects beyond the outer wall of the bowl, and is provided upon its exterior surface with screw-threads, as shown. A draw-nut 8 is threaded upon the projecting end of the ferrule and is adapted to jam the gasket 7 tightly between the ferrule and the adjacent walls defining the opening. The interior of the ferrule adjacent the outer end thereof is provided with a plurality of bosses 9, each of which is provided with an interiorly threaded longitudinally disposed opening, within which cap retaining screws 10 are adapted to be inserted. These retaining screws 10 extends through the central portion of a cover plate or cap 11, the latter being in the form of a disk having its edges bent inwardly to rest against the adjacent surface of the closet bowl. A gasket 12 is interposed between the outer end of the ferrule 5 and the under face of the cover plate or cap 11, so as to insure the connections against the passage of water therethrough.

It is obvious from this construction that an extremely simple and yet thoroughly practical and efficient trap clean out for closet bowls has been provided. When the bowl, gasket, draw-nut and cover plate have been properly applied, the passage of liquid through the clean out opening will be impossible. The elements employed in closing the clean out opening may be formed of any preferred metal, and it may be suggested that the cover plate 11 be formed of brass or nickel plated.

While the present is a disclosure of what is believed to be the preferred embodiment of the invention, it is to be understood that the invention is not limited thereto, but that various changes in the minor details of construction, proportion and arrangement of parts may be resorted to if desired without departing from the spirit of the invention as defined by the appended claim.

What is claimed is:

In a device of the class described, the combination with a surface having an opening therein, of a ferrule extending through said opening and protruding beyond the wall of said surface at one end, a flange at the opposite end of said ferrule engaging the inner walls of said surface, a washer interposed between said ferrule and the walls defining said opening, threads upon the exterior of the protruding portion of said ferrule, a draw-nut threaded upon said threads, bosses upon the interior of said ferrule, the said bosses being provided with longitudinally disposed interiorly threaded openings, a cover plate for closing the protruding end of said ferrule, retaining screws extending through said cover plate and being threadedly engaged in the openings in said bosses, and a washer interposed between the outer end of said ferrule and said cover plate.

In testimony whereof we affix our signatures in presence of two witnesses.

ERNEST REINHART.
ANDREW MOE.

Witnesses:
E. G. SARNSON,
OSCAR M. NELSON.